United States Patent [19]

Ting

[11] Patent Number: 4,731,414

[45] Date of Patent: Mar. 15, 1988

[54] BLENDS OF AN ASA TERPOLYMER, AN ACRYLIC POLYMER AND AN ACRYLATE BASED IMPACT MODIFIER

[75] Inventor: Sai-Pei Ting, Delmar, N.Y.

[73] Assignee: General Electric Company, Selkirk, N.Y.

[21] Appl. No.: 876,614

[22] Filed: Jun. 20, 1986

[51] Int. Cl.$^4$ .................. C08L 33/08; C08L 33/10; C08L 33/12; C08L 51/06

[52] U.S. Cl. .................................. 525/71; 525/70; 525/80; 525/902; 525/903

[58] Field of Search .............. 525/71, 902, 903, 80, 525/70

[56] References Cited

U.S. PATENT DOCUMENTS

| | | | |
|---|---|---|---|
| 3,655,826 | 4/1972 | Fellman et al. | 260/885 |
| 3,808,180 | 4/1976 | Owens | 260/885 |
| 3,944,631 | 3/1976 | Yu et al. | 260/885 |
| 4,224,419 | 9/1980 | Swoboda et al. | 525/71 |
| 4,351,921 | 9/1982 | Kishida et al. | 525/71 |
| 4,433,102 | 2/1984 | Brandstetter et al. | 525/71 |
| 4,517,339 | 5/1985 | Aliberto et al. | 525/71 |
| 4,579,909 | 4/1986 | Giles, Jr. et al. | 525/67 |

*Primary Examiner*—Allan M. Lieberman
*Attorney, Agent, or Firm*—Michael J. Doyle

[57] ABSTRACT

Blends of (A) an impact resistant interpolymer comprising crosslinked acrylic or methacrylic rubber, crosslinked styrene-acrylonitrile and uncrosslinked styrene-acrylonitrile polymer components, (B) an acrylic polymer, and (C) a multistage grafted acrylic elastomer are disclosed. The blends display a good combination of physical properties including gloss, impact strength and tensile properties.

8 Claims, No Drawings

BLENDS OF AN ASA TERPOLYMER, AN ACRYLIC POLYMER AND AN ACRYLATE BASED IMPACT MODIFIER

BACKGROUND OF THE INVENTION

1. Field of the Invention

The present invention relates to blends of (A) an acrylate-styrene-acrylonitrile terpolymer such as the type comprising crosslinked (meth)acrylate, crosslinked styrene-acrylonitrile, and linear, uncrosslinked styrene-acrylonitrile components and (B) an acrylic polymer, such as polymethyl methacrylate resin, and (C) an impact modifier comprising a crosslinked alkyl acrylate graft linked to a polymethyl methacrylate. The resulting blends can be used to form weatherable, impact resistant articles.

2. Description of the Prior Art

ASA resins (also known as AAS resins) are terpolymers of acrylate, styrene, and acrylonitrile having an excellent combination of impact and weatherability properties and are especially suited for outdoor applications. An especially preferred ASA resin is that taught by Yu, et al. in U.S. Pat. No. 3,944,631 which provides a multi-stage interpenetrating polymer. For certain applications, however, it is desirable to provide a resin having both the aforementioned impact and weatherability properties as well as the superior gloss characteristics of acrylic-type resins.

Acrylic polymers, such as polymethyl methacrylate resins, have good optical quality, excellent weatherability and good tensile and flexural strength. They find use in a wide variety of applications including building panels and trim, external vehicle components, outdoor furniture, swimming pool parts, and so forth. The impact resistance of unmodified acrylic resins is, however, very low and precludes the use of those resins in certain applications where a higher degree of impact resistance is also desired.

In U.S. Pat. No. 3,655,826, R. P. Fellmann et al. proposed to blend various thermoplastic polymers (including acrylic resins, see Col. 8, lines 11-13) and a three-stage acrylic elastomer impact resistant interpolymer. This prior art reference indicates that the selection of the third phase of the interpolymer is crucial, and it suggests that when impact modification is desired, the third stage should be a methacrylate or acrylate (see Col. 5, lines 65-70).

In U.S. application Ser. No. 176,887, filed on Aug. 11, 1980, now abandoned, a blend of acrylic polymer and acrylonitrile-styrene-acrylate interpolymer having weatherable, impact resistant properties was proposed. As expected, the impact properties of the acrylic resin was improved by the addition of rubbery impact modifiers, however, improvement in impact was at the expense of other properties such as flexural and tensile properties and gloss.

It has now been unexpectedly discovered that the aforementioned ASA and acrylic polymers can be used in combination with an acrylate-based impact modifier to improve the impact strength of acrylic resin-ASA blends while maintaining acceptable tensile, flexural and gloss properties.

SUMMARY OF THE PRESENT INVENTION

The present invention relates to a weatherable, impact resistant blend of: (A) an acrylate-styrene-acrylonitrile polymer (ASA) which is preferably comprised of crosslinked (meth)acrylate, crosslinked styrene-acrylonitrile, and uncrosslinked styrene-acrylonitrile polymer components; and (B) an acrylic polymer, such as polymethyl methacrylate resin; and (C) an impact modifier comprising a multistage elastomer of a crosslinked alkyl acrylate which is graft linked to a polymethyl (meth)acrylate resin.

A preferred ASA interpolymer is more fully described in U.S. Pat. No. 3,944,631 to A. J. Yu et al. It has been described in the prior art as being a suitable additive for polycarbonate resins (U.S. Pat. No. 4,148,842 to A. J. Yu et al.), for blends of chlorinated vinyl chloride polymer and vinyl chloride polymer (U.S. Pat. No. 4,160,793 to P. Kraft et al.), and for vinyl chloride polymers (U.S. Pat. No. 4,168,285).

The graft-linked impact modifier has been described in U.S. Pat. No. 3,808,180 to F. H. Owens and has been described as a useful modifier for acrylic and vinyl halide resins.

The foregoing combination of thermoplastic resins and elastomeric impact modifier will provide significantly improved blends having some of the desirable properties of both base resins.

The blends of the present invention can be formulated in a wide range of weight ratios. Generally, per 100 parts by weight of ASA resin (A) and acrylic resin (B) taken together, ASA resin (A) may comprise 5 to 95 parts and acrylic resin (B) may correspondingly comprise 95 to 5 parts. Preferred blends will contain 20 to 80 parts ASA per 80 to 20 parts acrylic.

The acrylate rubber additive (C) will generally be used in amounts of about 1 to 40 parts by weight based upon 100 parts of resins (A) and (B) taken together. Preferably, about 5 to 20 parts of the acrylate rubber additive will be used.

DESCRIPTION OF PREFERRED EMBODIMENTS

The term "acrylic resin", as used herein, is intended to encompass those acrylic resins which are made by the polymerization of acrylic ester monomers. Details regarding the structure of these polymeric materials as well as the processes for forming them are available from a number of sources including Modern Plastics Encyclopedia (1977-1978 Edition) pp. 9-10; Handbook of Plastics and Elastomers, C. A. Harper, ed., McGraw-Hill, Inc. 1975, pp. 1-71 to 1-75; and Polymers and Resins by B. Golding, Van nostrand Co., 1959, pp. 448-462. Representative polymers which are included in this class of acrylic resins or plastics include: polymethyl (meth)acrylate (often designated PMMA), polyethyl acrylate and polybutyl acrylate. Copolymers of these acrylic esters with minor amounts of one or more copolymerizable monomers are also intended to be encompassed, e.g., the copolymer of methyl methacrylate with styrene and acrylonitrile. Commercially available acrylic resins include those sold under the following trademarks: LUCITE (E. I. duPont de Nemours and Co.); and PLEXIGLAS (Rohm and Haas Co.). Due to its good properties and ease of availability, PMMA ia a preferred acrylic resin for use in compositions of the present invention.

The foregoing acrylic type resin is blended with acrylate-styrene-acrylonitrile terpolymer. ASA terpolymers of various types are available from several commercial sources. However, for a good balance of overall properties including impact, tensile and flexural properties as well as gloss, it is particularly preferred that the selected ASA resin is an interpolymer (i.e. interpenetrating network) comprised of crosslinked (meth)acrylate, crosslinked styrene-acrylonitrile, and uncrosslinked styrene-acrylonitrile components.

The terminology "interpolymer comprised of crosslinked (meth) acrylate, crosslinked styrene-acrylonitrile, and uncrosslinked styrene-acrylonitrile components" is meant to encompass the type of interpolymer compositions described in U.S. Pat. No. 3,944,631 to A. J. Yu et al. These preferred interpolymer compositions are typically formed by the following type of three-step, sequential polymerization process:

1. emulsion polymerizing a monomer charge (herein designated "(meth)acrylate", for the purposes of the present invention), of at least one $C_2$-$C_{10}$ alkyl acrylate, or $C_8$-$C_{22}$ alkyl (meth)acrylate or compatible mixtures thereof, in an aqueous polymerization medium in the presence of an effective amount of a suitable di- or polyethyleneically unsaturated crosslinking agent for such monomers, with the $C_4$-$C_8$ alkyl acrylates being the preferred (meth)acrylate monomers for use in this step;

2. emulsion polymerizing a monomer charge of styrene and acrylonitrile in an aqueous polymerization medium, also in the presence of an effective amount of a suitable di- or polyethyleneically unsaturated crosslinking agent for such monomers, said polymerization being carried out in the presence of the product from Step 1 so that the crosslinked (meth)acrylate and crosslinked styrene-acrylonitrile components form an interpolymer wherein the respective phases surround and penetrate one another; and 3. either emulsion or suspension polymerizing a monomer charge of styrene and acrylonitrile, in the absence of a crosslinking agent, in the presence of the product resulting from Step 2.

This ASA product is generally comprised of from about 5% to about 50%, by weight, of the above-identified crosslinked (meth) acrylate component, from about 5% to about 35%, by weight, of the uncrosslinked styrene-acrylonitrile component and from about 15% to about 90%, by weight, of the uncrosslinked styrene-acrylonitrile component.

The impact modifying component required for compositions of the present invention is a multistage elastomer comprised of a crosslinked alkyl acrylate which is graft linked to a polyacrylate resin, particularly polymethyl (meth)acrylate resin. Especially preferred grafted polymers are the core-shell polymers of the type available from Rohm & Haas such as Acrylodi® KM330. In general these impact modifiers contain units derived from n-butyl acrylate, alone or in combination with a vinyl aromatic compound. Impact modifiers of this type are disclosed by Owens in U.S. Pat. No. 3,808,180. Most preferably, the grafted core-shell impact modifier will comprise a two stage polymer having an n-butyl acrylate based rubbery core and a second stage polymerized from methylmethyacrylate alone or in combination with styrene. Also present in the first stage are crosslinking monomers and graft linking monomers. Examples of the crosslinking monomers include 1,3-butylene diacrylate, divinyl benzene and butylene dimethacrylate. Examples of graft linking monomers are allyl acrylate, allyl methacrylate and diallyl maleate.

Optionally, the compositions of this invention may further contain one or more reinforcing agents. Typical reinforcing agents useful for the invention include but are not limited to, glass fiber, mica or both. Compositions of this invention may also include effective amounts of conventional pigments, processing aides, lubricants and stabilizers such as oxidative and thermal stabilizers, and the like.

Blending of the formulation of the present invention can be achieved by any of the well-known polymer blending techniques, such as a two-roll or Banbury mixing, single or multiple screw extrusion, or any other method which applies sufficient heat and shear to the respective polymeric ingredients to obtain a uniform blend.

The present invention is further illustrated, without limitation, by the Examples which follow, wherein all parts are by weight (pbw) unless otherwise specified. All of the foregoing patents and applications are hereby incorporated by reference.

EXAMPLES 1–3

Compositions described in Table 1 were blended on a Henschel mixer. The blends were extruded on a 28 mm Werner & Pfleiderer twin screw extruder having extrusion set temperatures of 350°, 420°, 440°, 450°, 450°, and 450° F. The Extruded resin was molded into ASTM test specimens on a 3 ounce Newbury injection molding machine having barrel/mold set temperatures of 431°/150° F.

The formulations utilize these commercially available materials which are referenced in the tables:

ASA: GELOY® 1020 resin, General Electric Company N-butyl acrylate/styrene/acrylonitrile interpolymer (approx. wt. ratio 32/49.6/18.4 pbw)

PMMA: Continental CP-81 acrylic resin poly(methyl methacrylate), MFI=2.5

KM330: Acryloid® KM330 elastomer, Rohm & Haas Co. N-butyl acrylate/butylene glycol diacrylate/-methyl methacrylate/allylacrylate (80/0.35/20/0.3 pbw)

KG1651: Kraton® G1651 elastomer, Shell Chemical Co. partially hydrogenated triblock copolymer of styrene-ethylene butylene-styrene (SEBS) (styrene/E-B ratio approx. 33/67)

SAN: Lustran® 31, Monsanto Company styrene-acrylonitrile copolymer, (approx. 23% acrylonitrile, MFI=8)

For comparison, formulations in Table 1 were adjusted to maintain a nearly constant total rubber content, measured as a weight percent of the total resin composition.

It can be seen that Examples of the Invention (1, 2, and 3) exhibit improvement in Izod impact strength versus the comparative examples. Furthermore, compositions of the invention show good retention in tensile strength, flexural strength, and flexural modulus, as well as gloss. The comparative examples containing linear S-EB-S triblock copolymer exhibit reductions in these important properties.

TABLE 1

| SAMPLE | A* | B | C | 1 | 2 | 3 | D | E | F |
|---|---|---|---|---|---|---|---|---|---|
| ASA (GELOY 1020) | 100 | — | 65 | 52.5 | 40 | 27.5 | 54 | 43 | 32 |
| PMMA (CP-81) | — | 100 | 35 | 34 | 33 | 32 | 35 | 35 | 35 |
| GRAFTED ACRYLIC RUBBER | — | — | — | 5 | 10 | 15 | — | — | — |

TABLE 1-continued

| SAMPLE | A* | B | C | 1 | 2 | 3 | D | E | F |
| --- | --- | --- | --- | --- | --- | --- | --- | --- | --- |
| (KM-330) | | | | | | | | | |
| S-EB-S TRIBLOCK RUBBER (KG-1651) | — | — | — | — | — | — | 5 | 10 | 15 |
| SAN (LUSTRAN-31) | — | — | — | 8.5 | 17 | 25.5 | 6 | 12 | 18 |
| HDT (°F.) | 189 | 195 | 190 | 191 | 190 | 191 | 190 | 188 | 187 |
| IZOD (ft-lb/in) | 9.6 | 0.9 | 1.7 | 2.8 | 2.8 | 2.8 | 2.0 | 1.6 | 1.3 |
| TENSILE Y (psi) | 5610 | 11870 | 7710 | 7720 | 7690 | 7728 | 7268 | 6920 | 6530 |
| TENSILE S | 4200 | 11820 | 5720 | 5790 | 5780 | 5930 | 5648 | 5500 | 5350 |
| TENSILE E (%) | 23 | 12 | 24 | 21 | 21 | 20 | 26 | 29 | 31 |
| FLEX M (Kpsi) | 241 | 439 | 309 | 312 | 316 | 320 | 307 | 299 | 284 |
| FLEX S | 7.8 | 15.8 | 10.0 | 10.0 | 10.1 | 10.2 | 9.7 | 9.3 | 8.8 |
| MV @ 100 (430F) | 19790 | 21470 | 19440 | 17990 | 18690 | 18770 | 19240 | 18610 | 18690 |
| MV @ 1500 | 2350 | 3160 | 2590 | 2510 | 2500 | 2538 | 2560 | 2570 | 2590 |
| GLOSS (60°) | 91 | — | 84 | 83 | 84 | 86 | 62 | 56 | 55 |
| Y.I. | 27 | — | 31 | 28 | 24 | 22 | 36 | 38 | 36 |
| ROCKWELL HARDNESS | R85 | R122 | R108 | R108 | R108 | R109 | R105 | R105 | R102 |
| TOTAL RUBBER CONTENT (%) | 32 | — | 20.8 | 20.8 | 20.8 | 20.8 | 20.6 | 20.5 | 20.3 |

*A-F Are Comparative Examples

EXAMPLES 4-9

Similarly, additional resinous compositions of the present invention were prepared having the formulations described in Table 2. The Table 2 compositions did not contain SAN copolymer as a discrete component as did the Table 1 compositions. Additionally, each blend contained 0.3 pbw low density polyethylene (AC-392) and 0.2 pbw calcium stearate.

It is evident from the data in Table 2 that the impact properties of ASA-PMMA blends can be improved when combined with the grafted acrylic based elastomer, while the gloss, tensile and flexural properties are maintained. This is especially surprising since the comparative data in Table 1 suggests that gloss, tensile, and flexural properties of ASA-PMMA compositions are generally degraded when modified with linear triblock copolymer type modifiers (e.g. S-EB-S).

TABLE 2

| SAMPLE | G* | 4 | 5 | 6 | H | 7 | 8 | 9 |
| --- | --- | --- | --- | --- | --- | --- | --- | --- |
| ASA (GELOY 1020) | 65 | 65 | 65 | 65 | 35 | 35 | 35 | 35 |
| PMMA (CP-81) | 35 | 35 | 35 | 35 | 65 | 65 | 65 | 65 |
| GRAFTED ACRYLIC RUBBER (KM-330) | — | 2.5 | 5 | 10 | — | 5 | 10 | 15 |
| HDT (°F.) | 193 | 190 | 191 | 190 | 194 | 193 | 192 | 190 |
| IZOD (ft-lb/in) | 2.4 | 3.8 | 4.1 | 4.6 | 1.2 | 1.8 | 2.5 | 2.9 |
| DYNATUP (Max Load) | 91 | 85 | 118 | 156 | 13 | 19 | 37 | 56 |
| (in-lb) (Total E) | 116 | 111 | 239 | 229 | 15 | 20 | 97 | 120 |
| TENSILE Y (psi) | 7310 | 7090 | 6850 | 6500 | 8830 | 8100 | 7500 | 7090 |
| TENSILE S. | 5730 | 5490 | 5330 | 5110 | 6690 | 6450 | 6020 | 5760 |
| TENSILE E (%) | 20 | 22 | 22 | 25 | 27 | 28 | 30 | 30 |
| FLEX M. (Kpsi) | 308 | 302 | 290 | 275 | 369 | 344 | 318 | 301 |
| FLEX S. | 9.9 | 9.7 | 9.3 | 8.9 | 12.1 | 11.2 | 10.3 | 9.7 |
| MV @ 100 (430F) | 20050 | 20450 | 21300 | 21330 | 21168 | 21860 | 21550 | 22310 |
| MV @ 1500 | 2640 | 2720 | 2790 | 2868 | 2850 | 3000 | 2940 | 3068 |
| GLOSS (60°) | 86 | 87 | 86 | 84 | 88 | 85 | 84 | 83 |
| Y.I. | 27 | 29 | 28 | 28 | 42 | 40 | 38 | 35 |
| ROCKWELL HARDNESS | R106 | R106 | R103 | R100 | R117 | R115 | R112 | R110 |

*G and H are Comparative Examples

I claim:

1. A weatherable impact resistant resin composition comprising:
   (A) 5 to 95 parts of weight of an acrylate-styrene-acrylonitrile terpolymer resin;
   (B) 95 to 5 parts by weight of an acrylic resin made by the polymerization of acrylic ester monomers; and
   (C) 1 to 40 parts by weight per 100 parts of resins (A) and (B) taken together of an impact modifying component
   wherein said modifying component is comprised of a crosslinked alkyl acrylate-graft acrylate copolymer.

2. A composition as in claim 1 wherein said impact modifying component (C) is present in an amount of, approximately, 5 to 20 parts by weight based upon 100 parts by weight of said resins (A) and (B) taken together.

3. A composition as in claim 1 wherein said modifying component (C) is crosslinked n-butyl acrylate-graft-poly methyl (meth)acrylate.

4. A composition as in claim 1 wherein said acrylate-styrene-acrylonitrile terpolymer resin (A) is comprised of a combination of (a) a crosslinked (meth)acrylate surrounded and interpenetrated by a crosslinked styrene-acrylonitrile copolymer; and (b) a linear styrene-acrylonitrile copolymer.

5. A composition as in claim 4 wherein the acrylate-styrene-acrylonitrile terpolymer resin is comprised of about 5% to about 50% by weight of the (meth)acrylate component, and about 5% to 35% by weight of the crosslinked styrene-acrylonitrile component, and from about 15% to 90% by weight of the uncrosslinked styrene-acrylonitrile component.

6. A composition as in claim 4 wherein the (meth)acrylate component is selected from the group consisting of the crosslinked $C_2$- $C_{10}$ alkyl acrylates, the crosslinked $C_8$- $C_{22}$ alkyl methacrylates, and compatible mixtures thereof.

7. A composition as in claim 6 wherein the (meth)acrylate component is a crosslinked $C_4$- $C_8$ alkyl acrylate.

8. A composition as in claim 1 wherein the acrylic resin (B) is polymethyl (meth)acrylate.

* * * * *